Figure 3:
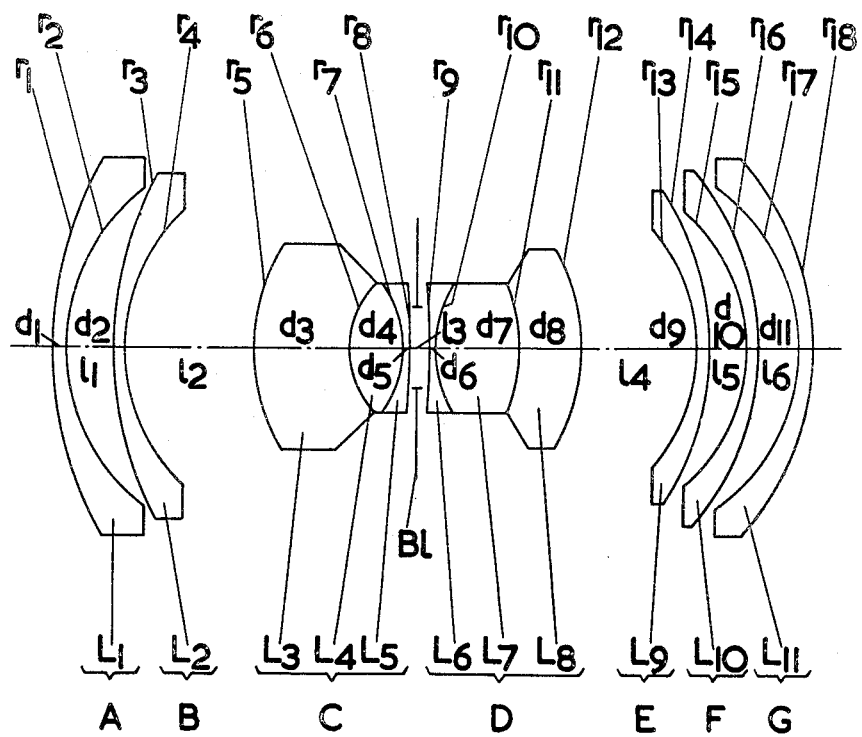

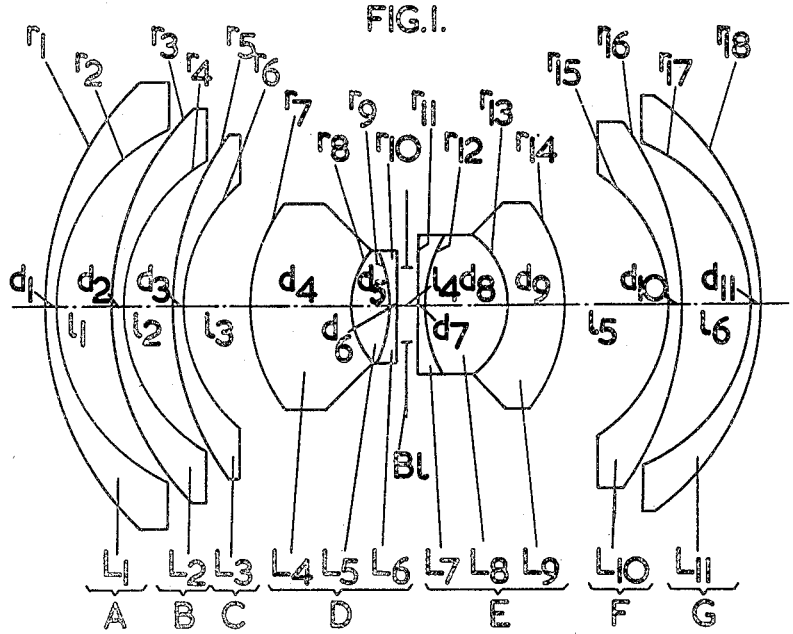
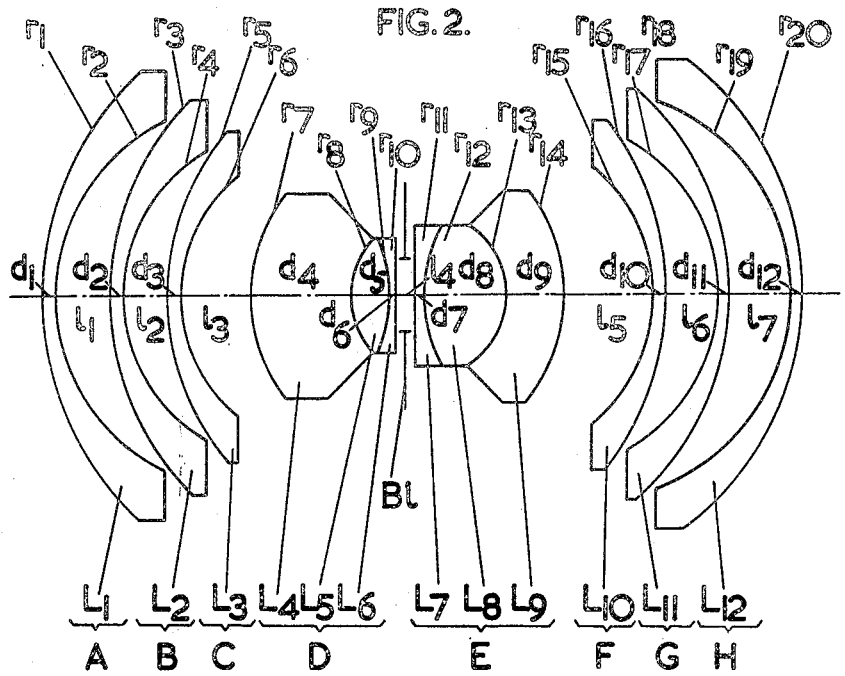

United States Patent Office 2,734,423
Patented Feb. 14, 1956

2,734,423

WIDE ANGLE OBJECTIVES HAVING A PLURALITY OF AXIALLY AIR SPACED COMPONENTS

Ludwig Jakob Bertele, Heerbrugg, Sankt Gallen, Switzerland

Application October 16, 1952, Serial No. 315,178

Claims priority, application Switzerland October 20, 1951

9 Claims. (Cl. 88—57)

The invention relates to wide angle objectives. In my co-pending United States patent applications Serial Nos. 209,359, now abandoned, and 396,513 an objective is disclosed consisting of two compound converging components having the diaphragm position between them, two diverging meniscus components at the object side and two at the image side of the converging components.

The expressions "object side" and "image side" are to be understood throughout this specification and the claims as denoting the sides towards the conjugate focal planes at greater and less distance respectively from the corresponding principal focal planes in the normal use of the objective.

According to the present invention an objective of the kind referred to has at least one additional diverging component of the same kind as the other diverging components. Thus an objective according to the invention must have at least seven components and may have more.

It is advantageous to make the separation between the two convex surfaces bounding the converging components and facing the negative components greater than 0.4 f and less than 1.6 f, where f denotes the total focal length of the objective. With a small aperture of the objective or low requirements regarding an extended range of the spherical aberration curve the maintenance of the lower limiting value suffices. With increasing aperture or a high demand on the zone freedom of the spherical aberration curve the upper limit should be more nearly approached.

Advantageously all the diverging meniscus components are so arranged that they have their concave surfaces towards the diaphragm position, and the air spaces between them have the form of converging menisci which have their less curved side towards the diaphragm position.

In order that the meridional branch of the astigmatism curve may for all image angles remain so far as possible in the plane of highest definition, the air space separating the two positive components is preferably made greater than 0.03 f.

For corresponding spherical abberation there may be inserted in both converging components closely located pairs of surfaces of which the centres of curvature lie between these two surfaces. Advantageously these pairs of surfaces are cemented, the refractive index on the convex side of this cemented surface always being greater than on the concave side.

In at least one of the converging components, preferably in both, there may be a further cemented surface which has its convex side towards the diaphragm position and which has the function of removing the residual coma, the refractive index on the convex side of this cemented surface always being smaller than on the concave side. The cemented surface in the converging component towards the object is effective chiefly in correcting coma of the rays leaving the objective with greater inclination to the optical axis than the rays of the same entering inclination passing towards the middle of the diaphragm. Oblique rays which leave the objective with less inclination to the optical axis than the rays mentioned are similarly corrected for coma by a cemented surface in the converging component towards the image.

If the refractive indices of the diverging components at the object side, where they are single lenses, have an average value not exceeding 1.60, the flatness of field is improved.

In order that the images produced by the various spectrum colours for all image angles coming into question may have as far as possible the same size, it is advisable to select the dispersion of these same components so that the average value of the Abbe numbers $$\nu = \frac{n_d - 1}{n_F - n_C}$$

is larger than 55.0. The average value is calculated from the sum of the $\nu$ values of the diverging lenses at the object side divided by the number of such lenses.

With an objective made up as described it is possible to achieve an extensive removal of all aberrations including distortion for large angles of view. The course of the spherical aberration and coma curves as well as of the astigmatism curve can be so far extended that only slight intermediate errors remain.

The accompanying drawings show three constructional examples of objectives in accordance with the invention, the numerical data being set out in the three tabulated examples.

In the drawings:

Figure 1 shows an objective of which the numerical data are set out in Example 1 hereinafter, Figure 2 shows a modified objective of which the numerical data are set out in Example 2 hereinafter, and Figure 3 shows a further modified objective of which the numerical data are set out in Example 3 hereinafter.

The cemented surfaces in the examples may also remain uncemented and be separated from each other by air spaces and have differing curvatures so far as no total internal reflection is to be feared of the rays of light required for producing the image.

If in one or other component such as air layer is introduced not substantially influencing the total effect of the objective a component subdivided in this manner is to be regarded for the purpose of the description as a single component.

The objective shown in Figure 1 has three diverging components A, B and C at the object side of the converging components D and E and two diverging components F and G at the image side. The distance between the two outer surfaces of the converging components, that is $r7$ to $r14$, is 0.889 f. The distance between the two converging components is 0.0503 f. The average value of the Abbe numbers of the diverging components A, B and C is 77.3.

The objective shown in Figure 2 has three diverging components A, B and C at the object side of the converging components D and E and three diverging components F, G and H at the image side. The distance between $r7$ and $r14$ is 0.888 f. The distance between the converging components is 0.0503 f. The average value of the Abbe numbers of the diverging components A, B and C is 77.3.

The objective shown in Figure 3 has two diverging components A and B at the object side of the converging components C and D and three diverging components E, F and G at the image side. The distance between $r5$ and $r12$ is 0.947 f. The distance between the two converging components is 0.0572 f. The average value of the Abbe numbers of the components A and B is 70.3.

Example 1 (Figure 1)

[Focal length f=100   Aperture f/6.3   Angle of view 120° to 125°]

|  | Radii | Thicknesses and separations | Refractive index $n_d$ | Abbe number $\nu$ |
|---|---|---|---|---|
| $L_1$ | $r_1 = +88.51$ | $d_1 = 3.52$ | 1.50380 | 66.7 |
|  | $r_2 = +54.50$ | $l_1 = 16.60$ |  |  |
|  | $r_3 = +79.46$ |  |  |  |
| $L_2$ |  | $d_2 = 3.52$ | 1.48697 | 70.0 |
|  | $r_4 = +47.48$ | $l_2 = 13.08$ |  |  |
|  | $r_5 = +87.50$ |  |  |  |
| $L_3$ |  | $d_3 = 4.02$ | 1.43388 | 95.2 |
|  | $r_6 = +44.96$ | $l_3 = 20.04$ |  |  |
|  | $r_7 = +49.99$ |  |  |  |
| $L_4$ |  | $d_4 = 29.17$ | 1.72050 | 50.3 |
| $L_5$ | $r_8 = +24.39$ | $d_5 = 10.66$ | 1.61270 | 58.6 |
|  | $r_9 = -40.23$ |  |  |  |
| $L_6$ |  | $d_6 = 2.01$ | 1.57270 | 51.0 |
|  | $r_{10} = \infty$ | $l_4 = 5.03$ |  |  |
|  | $r_{11} = \infty$ |  |  |  |
| $L_7$ |  | $d_7 = 2.01$ | 1.52800 | 51.0 |
|  | $r_{12} = +44.25$ |  |  |  |
| $L_8$ |  | $d_8 = 24.14$ | 1.61770 | 49.8 |
|  | $r_{13} = -23.95$ |  |  |  |
| $L_9$ |  | $d_9 = 15.89$ | 1.72150 | 29.3 |
|  | $r_{14} = -52.42$ | $l_5 = 30.55$ |  |  |
|  | $r_{15} = -45.91$ |  |  |  |
| $L_{10}$ |  | $d_{10} = 3.42$ | 1.62000 | 60.3 |
|  | $r_{16} = -89.45$ | $l_6 = 20.12$ |  |  |
|  | $r_{17} = -49.69$ |  |  |  |
| $L_{11}$ |  | $d_{11} = 3.00$ | 1.62000 | 60.3 |
|  | $r_{18} = -74.20$ |  |  |  |

Example 2 (Figure 2)

[Focal length f=100   Aperture f/6.3   Angle of view 120° to 125°]

|  | Radii | Thicknesses and separations | Refractive index $n_d$ | Abbe number $\nu$ |
|---|---|---|---|---|
| $L_1$ | $r_1 = +88.44$ | $d_1 = 3.52$ | 1.50380 | 66.7 |
|  | $r_2 = +54.46$ | $l_1 = 16.58$ |  |  |
|  | $r_3 = +79.40$ |  |  |  |
| $L_2$ |  | $d_2 = 3.52$ | 1.48697 | 70.0 |
|  | $r_4 = +47.45$ | $l_2 = 13.07$ |  |  |
|  | $r_5 = +87.44$ |  |  |  |
| $L_3$ |  | $d_3 = 4.02$ | 1.43388 | 95.2 |
|  | $r_6 = +44.92$ | $l_3 = 20.03$ |  |  |
|  | $r_7 = +49.95$ |  |  |  |
| $L_4$ |  | $d_4 = 29.15$ | 1.72050 | 50.3 |
| $L_5$ | $r_8 = +24.37$ | $d_5 = 10.65$ | 1.61270 | 58.6 |
|  | $r_9 = -40.20$ |  |  |  |
| $L_6$ |  | $d_6 = 2.01$ | 1.57270 | 51.0 |
|  | $r_{10} = \infty$ | $l_4 = 5.03$ |  |  |
|  | $r_{11} = \infty$ |  |  |  |
| $L_7$ |  | $d_7 = 2.01$ | 1.52800 | 51.0 |
|  | $r_{12} = +44.22$ |  |  |  |
| $L_8$ |  | $d_8 = 24.12$ | 1.61770 | 49.8 |
|  | $r_{13} = -23.93$ |  |  |  |
| $L_9$ |  | $d_9 = 15.88$ | 1.72150 | 29.3 |
|  | $r_{14} = -52.38$ | $l_5 = 25.93$ |  |  |
|  | $r_{15} = -47.73$ |  |  |  |
| $L_{10}$ |  | $d_{10} = 3.52$ | 1.5000 | 61.6 |
|  | $r_{16} = -81.92$ | $l_6 = 15.08$ |  |  |
|  | $r_{17} = -50.51$ |  |  |  |
| $L_{11}$ |  | $d_{11} = 3.52$ | 1.5000 | 61.6 |
|  | $r_{18} = -77.96$ | $l_7 = 17.09$ |  |  |
|  | $r_{19} = -57.48$ |  |  |  |
| $L_{12}$ |  | $d_{12} = 3.52$ | 1.5000 | 61.6 |
|  | $r_{20} = -83.93$ |  |  |  |

Example 3 (Figure 3)

[Focal length f=100   Aperture f/5.6   Angle of view about 90°]

|  | Radii | Thicknesses and separations | Refractive index $n_d$ | Abbe number $\nu$ |
|---|---|---|---|---|
| $L_1$ | $r_1 = +112.38$ | $d_1 = 3.39$ | 1.48697 | 70.3 |
|  | $r_2 = +54.11$ | $l_1 = 13.57$ |  |  |
|  | $r_3 = +112.38$ |  |  |  |
| $L_2$ |  | $d_2 = 3.39$ | 1.48697 | 70.3 |
|  | $r_4 = +52.07$ | $l_2 = 37.24$ |  |  |
|  | $r_5 = +56.80$ |  |  |  |
| $L_3$ |  | $d_3 = 27.47$ | 1.72050 | 50.3 |
|  | $r_6 = +25.20$ |  |  |  |
| $L_4$ |  | $d_4 = 15.65$ | 1.61761 | 49.7 |
|  | $r_7 = -33.40$ |  |  |  |
| $L_5$ |  | $d_5 = 1.60$ | 1.60739 | 40.3 |
|  | $r_8 = -923.00$ | $l_3 = 5.72$ |  |  |
|  | $r_9 = -1556.00$ |  |  |  |
| $L_6$ |  | $d_6 = 1.60$ | 1.55308 | 51.3 |
|  | $r_{10} = +37.91$ |  |  |  |
| $L_7$ |  | $d_7 = 24.78$ | 1.61470 | 51.2 |
|  | $r_{11} = -25.20$ |  |  |  |
| $L_8$ |  | $d_8 = 17.85$ | 1.71966 | 29.3 |
|  | $r_{12} = -56.80$ | $l_4 = 33.00$ |  |  |
|  | $r_{13} = -50.50$ |  |  |  |
| $L_9$ |  | $d_9 = 3.30$ | 1.50149 | 56.3 |
|  | $r_{14} = -85.40$ | $l_5 = 11.00$ |  |  |
|  | $r_{15} = -51.83$ |  |  |  |
| $L_{10}$ |  | $d_{10} = 3.30$ | 1.50149 | 56.3 |
|  | $r_{16} = -76.51$ | $l_6 = 12.00$ |  |  |
|  | $r_{17} = -56.13$ |  |  |  |
| $L_{11}$ |  | $d_{11} = 4.00$ | 1.50149 | 56.3 |
|  | $r_{18} = -80.37$ |  |  |  |

I claim:

1. A wide angle objective made up of at least seven components separated from each other by air spaces and located at least three on each side of the diaphragm position, there being two components each of converging power located respectively adjacent to and on opposite sides of the diaphragm position and having their extreme surfaces remote from the diaphragm position convex and separated from each other on the axis by a distance within the range 0.4 f to 1.6 f where f is the focal length of the complete objective, there being at least two diverging components on one side of the diaphragm position and spaced therefrom on the axis with one of said converging power components intervening between said two diverging components and the diaphragm position, and there being at least three diverging components on the other side of the diaphragm position and spaced therefrom on the axis with the other of said converging power components intervening between said three diverging components and said diaphragm position, said diverging components being respectively of diverging meniscus form concave towards the diaphragm position, and there being between each two adjacent diverging components an air space having the shape of a converging lens.

2. An objective as defined in claim 1, in which the surfaces of the converging components facing the diaphragm position have an axial distance between them exceeding 0.03 f.

3. An objective as defined in claim 1, in which each of the two converging components has a cemented surface with its centre of curvature between the said cemented surfaces of the two components and a refractive index on the convex side greater than that on the concave side.

4. An objective as defined in claim 3, in which at least one of the converging components has an additional cemented surface convex towards the diaphragm position, the refractive index on the convex side being less than that on the concave side.

5. An objective as defined in claim 1, in which the diverging components at the object side of the converging components are single lenses having an average refractive index for the d-line not exceeding 1.60.

6. An objective as defined in claim 1, in which the diverging components at the object side of the converging components are single lenses having an average Abbe number greater than 55.0.

7. An objective as defined in claim 1, having three diverging components on the object side of the converging components and two diverging components on the image side thereof.

8. An objective as defined in claim 1, having three diverging components on the object side of the converging components and three diverging components on the image side thereof.

9. An objective as defined in claim 1, having two diverging components on the object side of the converging components and three diverging components on the image side thereof.

References Cited in the file of this patent
UNITED STATES PATENTS

| | | |
|---|---|---|
| 2,031,792 | Richter | Feb. 25, 1936 |
| 2,146,662 | Van Albada | Feb. 7, 1939 |
| 2,516,724 | Roossinov | July 25, 1950 |
| 2,601,592 | Cook | June 24, 1952 |
| 2,628,532 | Baker | Feb. 17, 1953 |